W. A. GIBBS.
ANIMAL TRAP.
APPLICATION FILED JULY 24, 1917.
1,269,596.
Patented June 18, 1918.
2 SHEETS—SHEET 2.
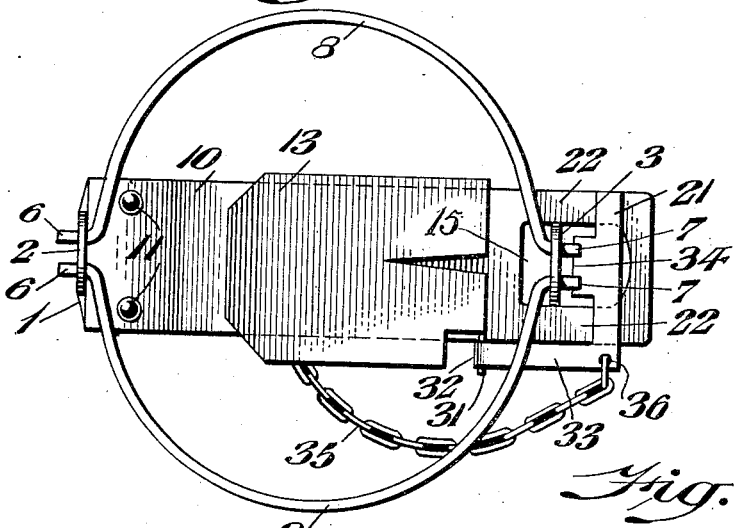
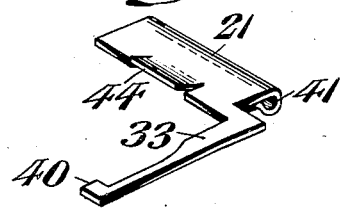
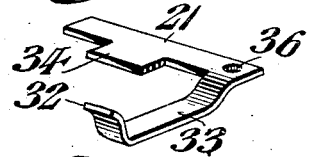
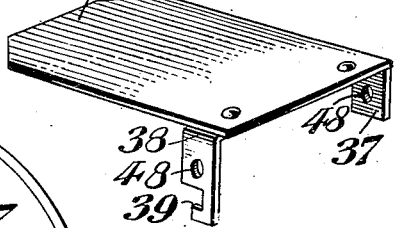
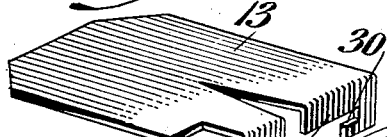
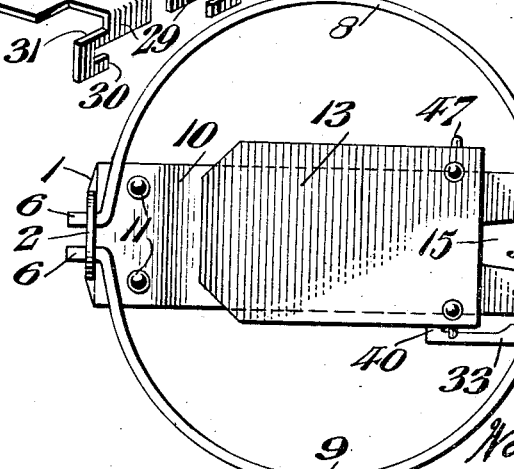
INVENTOR
Walter A. Gibbs.
BY Wiedersheim-Fairbanks,
ATTORNEYS

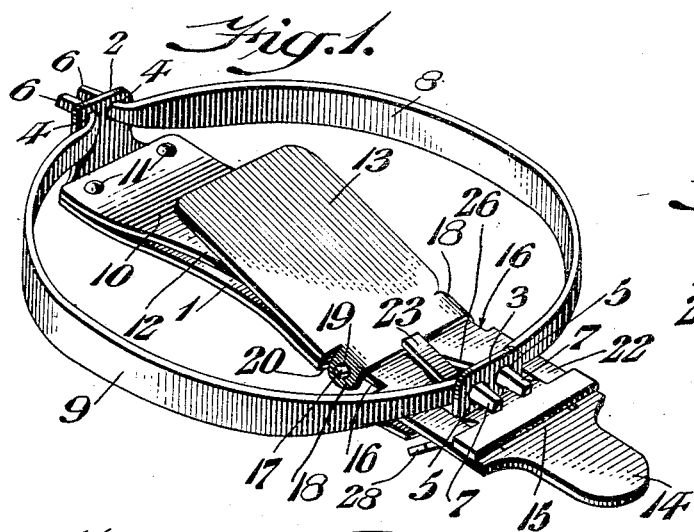

UNITED STATES PATENT OFFICE.

WALTER A. GIBBS, OF WILMINGTON, DELAWARE.

ANIMAL-TRAP.

1,269,596.  Specification of Letters Patent.  Patented June 18, 1918.

Application filed July 24, 1917. Serial No. 182,390.

*To all whom it may concern:*

Be it known that I, WALTER A. GIBBS, a citizen of the United States, residing in the city of Wilmington, county of New Castle, State of Delaware, have invented a new and useful Animal-Trap, of which the following is a specification.

The object of my present invention is to produce a novel construction of an animal trap, which is light in weight, which can be cheaply manufactured, and in which the necessity of employing a cross bar for carrying the locking and releasing mechanism is eliminated.

My invention relates to the class of devices employed to trap animals commonly known as steel traps, which have the locking and releasing mechanism for the spring substantially parallel with the spring and axis of the jaws.

In the construction when in use, the end of the pivot points of the jaws nearest the free end of the spring are used as a holding point for the latch, which permits of the distance between the holding point and pivot point of the latch being reduced to such a small fraction that the severe tension of the spring is not transmitted to the end of the latch, which rests on the pan or releasing element.

In this construction, I provide for the latch flying downward instead of up when the trap is released, which prevents absolutely the liability of throwing a part of the animal contacting with the trap out of it or throwing the trap away from an animal under such conditions, as might otherwise be the case if such animal came in contact with the latch flying upwardly.

This general idea is accomplished in a number of ways, as are shown in the drawings, the preferred way being the loose latch arrangement inasmuch as it is cheaper and easier to install.

With the foregoing principal objects in view, my invention comprehends the devices set forth in the accompanying drawings and hereinafter described and claimed.

For the purpose of illustrating my invention, I have shown in the accompanying drawings, three typical embodiments of it which are at present preferred by me because in practice I have found them to give satisfactory and reliable results.

It is to be understood, however, that the devices in which my invention is embodied may be variously arranged and organized, and that I do not confine myself to the specific arrangement and assemblage herein shown and described.

In the accompanying drawings—

Figure 1 represents in perspective an animal trap embodying my invention, the trap being set and not sprung.

Fig. 2 represents the trap of Fig. 1 in plan view and in the position shown in Fig. 1.

Fig. 3 represents in side elevation the trap of Figs. 1 and 2 in its sprung position.

Fig. 4 represents a fragmentary longitudinal sectional detail on the line 4—4 of Fig. 2, of the trigger and coöperating elements in the position which they occupy when the trap is set as in Figs. 1 and 2.

Fig. 5 represents a perspective view of the trigger represented in Figs. 1 to 4 inclusive, removed from the trap.

Fig. 6 represents in top plan view a modified embodiment of my invention, the trap being set.

Fig. 7 represents in perspective the trigger which I employ in the construction represented in Fig. 6, shown removed from the trap.

Fig. 8 represents in perspective the footpiece shown in Fig. 6 removed from the trap.

Fig. 9 represents in plan still another slightly modified embodiment of my invention, the trap being set.

Fig. 10 represents removed from the trap and in perspective, the trigger of the trap of Fig. 9, and Fig. 11 represents in perspective and removed from the trap of Fig. 9, the footpiece of that embodiment.

Similar numerals of reference indicate corresponding parts.

Referring to the drawings and first to the embodiment shown in Figs. 1 to 5 inclusive—

1 represents a base plate which constitutes the base of the trap as an entirety and is adapted to be either laid upon the ground or secured against shifting by any preferred means. It is preferably formed of sheet metal stamped, and has two upturned ends, 2 at the outer end and 3 at the inner end. These two ends each occupy relatively opposite positions at the ends of the base plate, and are each formed with punched bearings, 4—4 through the end 2, and 5—5 through the end 3.

Into these bearings are respectively entered studs or trunnions, 6—6 in the bearings 4—4 and 7—7 in the bearings 5—5,— and these trunnions are respectively formed on the respective outer ends of semi-elliptical or semi-circular jaws 8 and 9, which when the trap is set occupy the flattened out position shown in Figs. 1 and 2, and when the trap is sprung the closed position shown in Fig. 3.

10 is a spring plate, riveted or otherwise fixedly secured as at 11 to the base plate of the trap or near its outer end 2. This spring plate is midway of its length preferably formed with an upwardly curved or humped surface 12 over which rests a footpiece 13 upon which the animal to be trapped is assumed to tread and bear its weight. The spring plate is preferably extended to the right hand side of the trap, as shown in Figs. 1, 2 and 3, to a distance sufficiently beyond the jaws, the right-hand ends of which pass through it, to permit of its being formed into or provided with a setting thumb-piece 14 by pressure upon which, as will be later understood, the trap is set. The spring plate is provided with an elongated slot 15 through which, as mentioned, the right hand end portions of the jaws pass, and within and with respect to which the trigger is located and adapted to operate.

The spring plate is furthermore preferably provided with lateral recesses 16—16, which are located near its outer or thumbpiece end, and which are themselves so shaped or cut out as to form intermediately of their lengths pins 17—17 upon which the footpiece is at its outer end mounted, preferably by being itself formed with downturned flanges 18—18, which are each formed with an aperture 19—19, which fit over the pins 17—17 and create a hinged relationship between the foot piece 13 and the spring plate 10.

20—20 are notches in the sides of the base plate into which the downturned flanges 18—18 of the footpiece enter, so as to permit the spring to move downwardly sufficiently for the outward movement of the jaws 8 and 9 away from each other as shown in Figs. 1 and 2.

The trigger which as an entirety holds the spring plate in its depressed position shown in Figs. 1 and 2, and which is adapted to fit and fulcrum within and with respect to the jaw slot 15, is preferably formed by punching out a flat piece of sheet metal into the angular form,—shown particularly in Fig. 5 of the drawings, and is of the following construction :—

21 is a cross-head adapted in the mounting of the trigger relatively to the spring plate, to fit completely upon and across the jaw slot 15 and to rest and fulcrum on the sides 22—22 of said jaw slot.

23 is a latching tongue or trigger proper rearwardly extending from the cross-head 21 and preferably provided at its junction with said crosshead with squared shoulders 24—24. This tongue is bent to the curvature shown in the drawings and the intermediate crest of its bend is designated 25.

The free end of this tongue in the latching or setting of the trap is adapted to pass through the slot 26, which I term a tongue slot formed at the right-hand end of the base plate and extending through its inner upturned end 3.

In order to complete the hinging of the trigger relatively to the jaw slot and thumbpiece end of the spring plate, I form the cross-head with two downwardly extending arms 27—27, which terminate in outwardly and oppositely projecting pins 28, which extend beneath the sides 23 of the jaw slot 15 and as an entirety relatively to the jaw slot serve to prevent the trigger from coming out of the slot 15.

The operation of the device is as follows:—

Assume the parts in the position represented in Fig. 3, the spring plate in its upstanding position and the jaws closed,—in order to open the jaws and set the trap, pressure is exerted downwardly upon the thumb-piece 14, of the spring plate, with the result of carrying downward the latching tongue of the trigger, until its free end may be entered and passed through the slot 26 in the base plate and caught over the hinged end of the foot piece 13, as shown in Figs. 1 and 2. The outer end of the slot 26 forms a shoulder 49 against which the latching tongue 23 may bear, if desired, see Fig. 4.

During this downward movement the flanges 18 of the foot-piece 13 will have passed through the notches 20 in the sides of the base plate and the end of the tongue 23 can be deflected into the position shown in Fig. 4, so as to bring it upon the hinged inner end of the foot-piece 13 when the free end of said foot-piece is lifted into the position shown in Figs. 1 and 4.

Such being the set position of the device as an entirety, or that which is shown in Figs. 1, 2 and 4, it is obvious that any pressure, as of an animal upon the foot-piece, will cause its deflection about its hinge to an extent sufficient to set free the outer end of the latching tongue shown as resting upon it in Figs. 1, 2 and 4, and in so doing release the depressed spring plate 10 and permit its outer end or that nearest the thumb-piece to spring upwardly and in so doing turn the two jaws upon their trunnions with respect to their trunnion bearings and clamp them together by the pressure exercised upon their under sides by the upper sides 22 of the slot 15 of the spring plate 10 in the springing up of the latter.

Referring now to the modification represented in Figs. 6, 7 and 8, the base plate 1, the jaws 8 and 9, spring plate 10 and the foot-piece 13, are all essentially of the same construction and relative connection and mounting as in the construction of Figs. 1 to 5 inclusive,—except that I have not shown the extended thumb-piece 14.

The form of the foot-piece is essentially identical with the foot-piece of the first embodiment, except that its hinged relation to the spring plate is accomplished by turning down its inner or front end to form a depending flange 29, which possesses the form shown in Fig. 8, and is provided with inturned knuckles 30, which extend oppositely and inwardly and are fitted in under the spring plate 10 so as to catch and bear against its under surface preferably with relation to notches, not shown, formed in the sides of said spring plate.

One side of the inner end of this foot-piece is channeled to form what I call a lock notch 31, with which the inner curved free end 32 of the trigger 33 is adapted in the setting of the parts to bear and engage. The trigger as an entirety differs from that of the first embodiment in that the cross-head 21 has the trigger arm 33 extending from one side of it, while about midway of said crosshead there is a forwardly extending engaging lip 34, which in the setting of the trap when the parts are in the position shown in Fig. 6, comes and catches beneath the trunnions 7—7 of the jaws.

In the application of this trigger as an entirety, and it also is preferably formed as a stamped piece of sheet metal, the crosshead lies upon the upper surfaces of the sides 22 which longitudinally bound the slot 15 formed in the end of the spring plate 10.

As the trigger, alike with the trigger of the first embodiment, is a detachable member, I provide as means for securing it against being lost, a connecting chain or link 35, of any character, fastened at one end to the base plate 1 of the trap and at the other end to the trigger preferably through an aperture 36 in that end of the crosshead from which extends the arm 33.

The operation of the device is the following:—

To set the trap, the spring plate is depressed so that its slotted end is forced below the trunnions 7—7 of the jaws, and when in this position the trigger is in the position shown in Fig. 6 with its crosshead 21 lying upon the sides 22 of the spring plate with its engaging lip 34 extending and caught beneath said trunnions, and with its trigger arm 33 necessarily in such position that its inner bent-over free end 32 may engage with the lock notch 31 of the foot-piece 13.

When in this position, the foot-piece is of course raised above the spring plate at the end opposite the end where it is hinged to said plate as shown in Figs. 1 and 2, and obviously when the weight of an animal comes upon it, the foot-piece is so deflected upon its inturned knuckles 30 which hinge it to the spring plate, that the end 32 of the trigger arm is freed from the lock notch 31, and the trigger as an entirety caused to turn upon its cross-head as a fulcrum so as to move the engaging lip 34 away from or clear of the trunnions 7—7 of the jaws, and so release the spring plate and permit it to fly upward and with it carry up the jaws into their closed position, as shown in Fig. 3.

Referring now to the modification represented in Figs. 9, 10 and 11, the base plate 1, the jaws 8 and 9, the spring plate 10 and the foot piece 13 are essentially of the same construction and relative connection and mounting as in the construction of Figs. 1 to 5 inclusive, and Figs. 6 to 8 inclusive.

The foot-piece differs from the footpiece of the first two embodiments only in that its hinging to the spring plate 10 is effected not by bending in its end but by riveting to it a pair of downturned flanges 37 and 38, of which the flange 38 is provided with a depending hook or catch 39, which serves when the trap is set to engage the outer end 40 of the trigger arm 33. A positive connection of the footpiece with the spring plate is conveniently effected by mounting an axial rod 47 mounted in any preferred manner upon the upper face of the spring plate, which rod passes through holes 48 in the flanges 37 and 38.

The trigger in this construction instead of being free from the outer end of the spring plate 10, which in this instance is provided with a thumb piece 14, is hinged beneath the spring plate conveniently by being bent in to form a tubular sleeve 41, Fig. 10, which is pivotally connected with downturned flanges 42, Fig. 9, which are the ends of a crossplate 45 riveted at 46 to the spring plate, through which flanges and through the sleeve, pass an axial pin 43.

The crosshead 21 of the trigger is midway of its length formed with an engaging lip 44 stamped so as to be slightly deflected from the face of the cross-head, which in the setting of the trap serves to engage beneath the trunnions 7—7 of the jaws at the same time that the outer end 40 of the trigger arm 33 engages with the catch 39 of the foot piece 13 and sets the trap.

In the setting of this modified form of trap, the spring plate is depressed to an extent sufficient to permit of the lateral deflection or opening of the jaws, as shown in Fig. 9, and the engagement of the lip 44 beneath the trunnions 7—7 of the jaws, and further to permit of the latching or connection of the outer end 40 of the trigger 33 with the catch 39 in the flange 38 of the foot-piece.

In this position, the footpiece will be elevated into the position shown in Fig. 1, and when deflected by the weight of an animal coming up on it, it will by its deflection occasion the release of the trigger from the catch 39 of the footpiece and the consequent deflection of the lip 44 from beneath the trunnions 7—7, with the result that the spring plate will spring upwardly into the position shown in Fig. 3, and in so doing and through its walled slot will throw or clamp the jaws together.

Having thus described my invention, what I claim as new and desire to secure by Letters Patent, is:

1. An animal trap having a latch, and releasing means therefor arranged parallel to the longitudinal axis of the trap, said latch moving downwardly to effect its release.

2. In an animal trap, movable jaws having trunnions at one end, means to effect the closing of said jaws, and means bearing against said trunnions to lock the trap in set position.

3. An animal trap comprising the jaws, a spring to effect their closing, and releasing means for said spring including a latch carried by the portion of said spring which moves to effect the closing of said jaws.

4. An animal trap, comprising the jaws, a spring to effect their closing, and releasing means for said spring including a latch positioned between said spring and trunnions of said jaws and engaging said trunnions to retain said jaws in set position.

5. An animal trap comprising the jaws, a latch to lock the jaws in set position, a spring, and a treadle carried by said spring, said latch when in set position bearing against the upper face of said treadle whereby when said treadle is depressed it moves out of the path of said latch to release the latch and effect the closing of said jaws.

6. An animal trap, comprising the jaws, a spring to effect their closing, and releasing means for said spring including a treadle and a latch carried by the portion of said spring which moves to effect the closing of said jaws.

WALTER A. GIBBS.

Witnesses:
H. S. FAIRBANKS,
C. D. McVAY.

Copies of this patent may be obtained for five cents each, by addressing the "Commissioner of Patents, Washington, D. C."